United States Patent
Jallon

(10) Patent No.: US 8,144,754 B2
(45) Date of Patent: Mar. 27, 2012

(54) METHOD FOR DETECTING THE PRESENCE OF SPREAD SPECTRUM SIGNALS

(75) Inventor: Pierre Jallon, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 219 days.

(21) Appl. No.: 12/669,138

(22) PCT Filed: Jul. 17, 2008

(86) PCT No.: PCT/EP2008/059395
§ 371 (c)(1), (2), (4) Date: Jan. 14, 2010

(87) PCT Pub. No.: WO2009/010563
PCT Pub. Date: Jan. 22, 2009

(65) Prior Publication Data
US 2010/0189161 A1      Jul. 29, 2010

(30) Foreign Application Priority Data
Jul. 17, 2007   (FR) ..................... 07 56529

(51) Int. Cl.
*H04B 1/00*      (2006.01)
(52) U.S. Cl. ........ 375/150; 375/142; 375/143; 375/147; 375/152; 375/316
(58) Field of Classification Search .............. 375/142, 375/143, 147, 150, 152, 316
See application file for complete search history.

(56) References Cited

U.S. PATENT DOCUMENTS

| | | | | |
|---|---|---|---|---|
| 6,108,317 A | * | 8/2000 | Jones et al. | 370/320 |
| 6,891,815 B1 | * | 5/2005 | Song | 370/335 |
| 7,031,344 B2 | * | 4/2006 | Rakib et al. | 370/479 |
| 2006/0109931 A1 | | 5/2006 | Asai et al. | |

FOREIGN PATENT DOCUMENTS

EP     1 655 872     5/2006

OTHER PUBLICATIONS

Oener, Menguec et al., "Air Interface Recognition for a Software Radio System Exploiting Cyclostationarity", IEEE International Symposium on Personal, Indoor and Mobile Radio Communications, vol. 3, pp. 1947-1951, (Sep. 5, 2004).

(Continued)

*Primary Examiner* — Ted Wang
(74) *Attorney, Agent, or Firm* — Oblon, Spivak, McClelland, Maier & Neustadt, L.L.P.

(57) ABSTRACT

The present invention relates to a method for detecting the presence or the absence of a spread spectrum signal in a frequency band of interest of a received signal, wherein:
the autocorrelation function of said received signal is calculated for a set (S*) of non-zero time shift values (m);
at least one cyclic correlation coefficient on ($R_e^{k\alpha}(m)$) of the autocorrelation function is determined for said time shift values;
the energy of the autocorrelation function is estimated from the quadratic sum of the values assumed by said cyclic correlation coefficient for said time shift values;
the thereby estimated energy is compared with a predetermined threshold value and the presence or absence of said spread spectrum signal in the received signal is inferred from the result of the comparison.

10 Claims, 3 Drawing Sheets

OTHER PUBLICATIONS

Halford, Karen W. et al., "New-User Identification in a CDMA System", IEEE Transactions on Communications, vol. 46, No. 1, pp. 144-155, (Jan. 1998).

Jallon, Pierre et al., "Second-Order Based Cyclic Frequency Estimate: The Case of Digital Communication Signals", IEEE International Conference on Acoustics, Speech, and Signal Processing, pp. IV-389-IV392, (May 14, 2006).

Spooner, Chad M. et al., "Exploitation of Higher-Order Cyclostationarity for Weak-Signal Detection and Time-Delay Estimation", IEEE Sixth SP Workshop on Statistical Signal and Array Processing, pp. 197-201, (Oct. 7, 1992).

Oener, Menguec et al., "Extracting the Channel Allocation Information in a Spectrum Pooling System Exploiting Cyclostationarity", IEEE International Symposium on Personal, Indoor and Mobile Radio Communications, vol. 1, pp. 551-555, (Sep. 5, 2004).

Mitola III, Joseph "Cognitive Radio an Integrated Agent Architecture for Software Defined Radio", pp. i-vii and 1-304, XP-002475924, (May 8, 2000).

Dandawate, Amod V. et al., "Statistical Tests for Presence of Cyclostationarity", IEEE Transactions on Signal Processing, vol. 42, No. 9, pp. 2355-2369, (Sep. 1994).

* cited by examiner

METHOD FOR DETECTING THE PRESENCE OF SPREAD SPECTRUM SIGNALS

TECHNICAL FIELD

The present invention relates to the field of blind or semi-blind detection of spread spectrum signals. It notably finds application in cognitive radio systems.

STATE OF THE PRIOR ART

The increasingly large congestion of the spectrum has led to the consideration of telecommunications systems capable of coexisting with systems having already allocated frequency bands, so-called primary systems. Two coexistent strategies are presently the subject of significant research. The first consists of using a very low signal level by very strongly spreading out the spectrum, this is the way followed by ultra wide band systems further called UWB (Ultra Wide Band). The second consists of opportunistically using a portion of the spectrum which is punctually or temporarily unoccupied, this is the so-called opportunistic radio (or Cognitive Radio) way. A description of cognitive radio will be found in the founding thesis of J. Mitola entitled <<Cognitive radio: an integrated agent architecture for software defined radio>>, Royal Institute of Technology, Stockholm, PhD Dissertation, May 8, 2000.

In order to be able to transmit in a given band, a transmitter has to be able to determine whether a signal, and notably a spread spectrum signal is present in this band. Given that the spread signal may be buried in noise, with a simple power detector it is not possible to obtain this information reliably.

Generally a distinction is made between blind detection methods for which no a priori information is available on the signal, the presence of which is intended to be detected, and estimation methods of the semi-blind type for which certain parameters of the signal to be detected are known.

A method for semi-blind detection of the presence of spread spectrum signals was described in the article of G. Burel entitled <<Detection of spread spectrum transmissions using fluctuations of correlation estimators>> published in Proc. of IEEE-ISPACS Nov. 5-8, 2000, Honolulu, Hi. This method is based on the statistics of a moment of order 2 of the autocorrelation function of the received signal. It utilizes the fact that, when a spread spectrum signal is present, the fluctuations of the autocorrelation function are larger than in the presence of simple white noise. However, there again, for small signal-to-noise ratios, with the detection method it is not possible to determine with a low error rate whether a spread spectrum signal is absent or present. An opportunistic transmitter may wrongly decide to transmit in the band while a spread signal is present or else a contrario not transmit even if the band is free.

The object of the present invention is to propose a method with which it may be determined with higher reliability whether a spread spectrum signal is present or absent in a frequency band of interest and this, even under conditions of a small signal-to-noise ratio.

DISCUSSION OF THE INVENTION

The present invention is defined by a method for detecting the presence or absence of a spread spectrum signal in a frequency band of interest of a received signal, wherein:
the autocorrelation function of said received signal is calculated for a set of non-zero time shift values;
at least one cyclic correlation coefficient of the autocorrelation function is determined for said time shift values;
the energy of the autocorrelation function is estimated from the quadratic sum of the values assumed by said cyclic correlation coefficient for said time shift values;
the thereby estimated energy is compared with a predetermined threshold value and the presence or absence of said spread spectrum signal in the received signal is inferred from the result of the comparison.

According to a first alternative, a plurality of cyclic correlation coefficients of the autocorrelation function is determined, each cyclic correlation coefficients being calculated for said time shift values. Advantageously, said cyclic correlation coefficients may be calculated by:

$$\hat{R}_e^{k\alpha}(m) = \frac{1}{U}\sum_{u=0}^{U-1} s(uT_e)s^*((u-m)T_e)e^{2i\pi uk\alpha}$$

wherein s( ) is the received signal, after base band translation, U is the size of the correlation window, $T_e$ is the sampling period, expressed as a number of samples, m is a time shift expressed as a number of samples, k is a relative integer, $$\alpha = \frac{T_e}{LT_c}$$

is the ratio of the sampling period to the duration of the spreading sequence which was used for spreading out the spectrum of the signal.

The energy of the autocorrelation function is then advantageously estimated from:

$$\hat{J} = \sum_{m \in S^*}\sum_{k \in \Omega} |R_e^{k\alpha}(m)|^2$$

wherein $\Omega$ is a finite set of relative integers and $S^*$ is a finite set of relative integers which do not comprise the zero value.

According to a second alternative, a cyclic correlation coefficient of the autocorrelation function is determined for a plurality of time shift values. Advantageously, said cyclic correlation coefficient is obtained by:

$$R_e^0(m) = \frac{1}{U}\sum_{u=0}^{I-1} s(uT_e)s^*((u-m)T_e)$$

wherein s( ) is the received signal, after base band translation, U is the size of the correlation window, $T_e$ is the sampling period, expressed as a number of samples, m is a time shift expressed as a number of samples.

The energy of the autocorrelation function is then advantageously estimated from:

$$\hat{J} = \sum_{m \in S^*} |R_e^0(m)|^2$$

wherein $S^*$ is a finite set of relative integers which do not comprise the zero value.

According to the first or second alternative, the estimated energy $\hat{J}$ is then compared with a predetermined threshold value $J_0$, calculated as a function of the ratio $$\frac{U}{\sigma^4}$$

wherein $\sigma^2$ is the noise variance.

For small signal-to-noise ratios, the noise variance, $\sigma^2$, may be estimated by:

$$\sigma^2 = \frac{1}{U}\sum_{u=0}^{U-1}|s(uT_e)|^2$$

It will be concluded that a spread spectrum signal is present in the frequency band of interest if $\hat{J}>J_0$ and otherwise, that such a signal is absent in said band.

SHORT DESCRIPTION OF THE DRAWINGS

Other features and advantages of the invention will become apparent upon reading a preferential embodiment of the invention made with reference to the appended figures wherein.

DETAILED DISCUSSION OF PARTICULAR EMBODIMENTS

We shall consider in the following the case of an opportunistic, also called secondary terminal, which has to determine whether a primary terminal transmits in a frequency band of interest. We shall assume that this primary telecommunications system (i.e. with an allocated frequency band), if it is transmitting, uses a direct spread spectrum as this is conventionally the case in CDMA (Code Division Multiple Access) systems. In other words, if a spread spectrum signal is present, the opportunistic terminal receives:

$$s(t) = \sum_p a_p \sum_{l=0}^{L-1} c_l g(t - lT_c - pT_s) + b(t) \quad (1)$$

wherein $c_l$, $l=0,\ldots,L-1$ is the spectrum spreading sequence, $T_c$ is the chip period, $T_s=LT_c$ is the symbol period, $a_p$ are the transmitted information symbols, $g(t)$ is the convolution of the symbol-shaping pulse by the impulse response of the channel, and $b(t)$ is a random function describing the noise.

We shall assume without any loss of generality, that the received signal is sampled at the chip frequency, and we shall denote the relevant samples $e_n=s(nT_c)$. Accordingly, we have:

$$e_n = a_p c_l g_{p,l,n} + b_n \quad (2)$$

with $g_{p,l,n}=g(n-pL-l)T_c)$ and wherein $b_n$ are the noise samples.

The autocorrelation function of the received signal may then be expressed as:

$$R_e(n,m) = \mathcal{E}\{e_n e_{n-m}^*\} \quad (3)$$

wherein $\mathcal{E}\{.\}$ designates the mathematical expectation and $mT_c=\tau$ is the time shift between the versions of the signal to be correlated.

If the notation $n=p_1L+l_1$ and $m=p_2L+l_2$ is used, the value $R_e(n,m)$ of the autocorrelation function may, given that the noise samples are independent of each other and of the signal, be written as:

$$R_e(n,m) = q_{p_1,l_1} g_{p_2,l_2}^* \cdot c_{l_1} c_{l_2}^* \mathcal{E}(a_{p_1} a_{p_2}^*) + \delta(m)\sigma^2 \quad (4)$$

wherein $\delta(.)$ is the Dirac distribution and $\sigma^2$ is the noise variance.

If $p_1 \neq p_2$, in other words if the correlation is dealing with different symbols, we have $\mathcal{E}(a_{p_1} a_{p_2}^*)=0$. Also, changing n into n+L, i.e. changing $p_1$ ($p_2$ resp.) into $p_1+1$ ($p_2+1$ resp.) leaves the function $R_e(n,m)$ invariant. In other words, the correlation function is periodic relatively to its first variable n and of period L. Considering the first period, i.e. $0 \leq n < L$, it may be shown that $R_e(n,m)$ is non-zero only if $-n \leq m < N-n$, in other words if the time shift is less than a symbol time. This is understood insofar that two consecutive symbols are not correlated.

Figure 1:
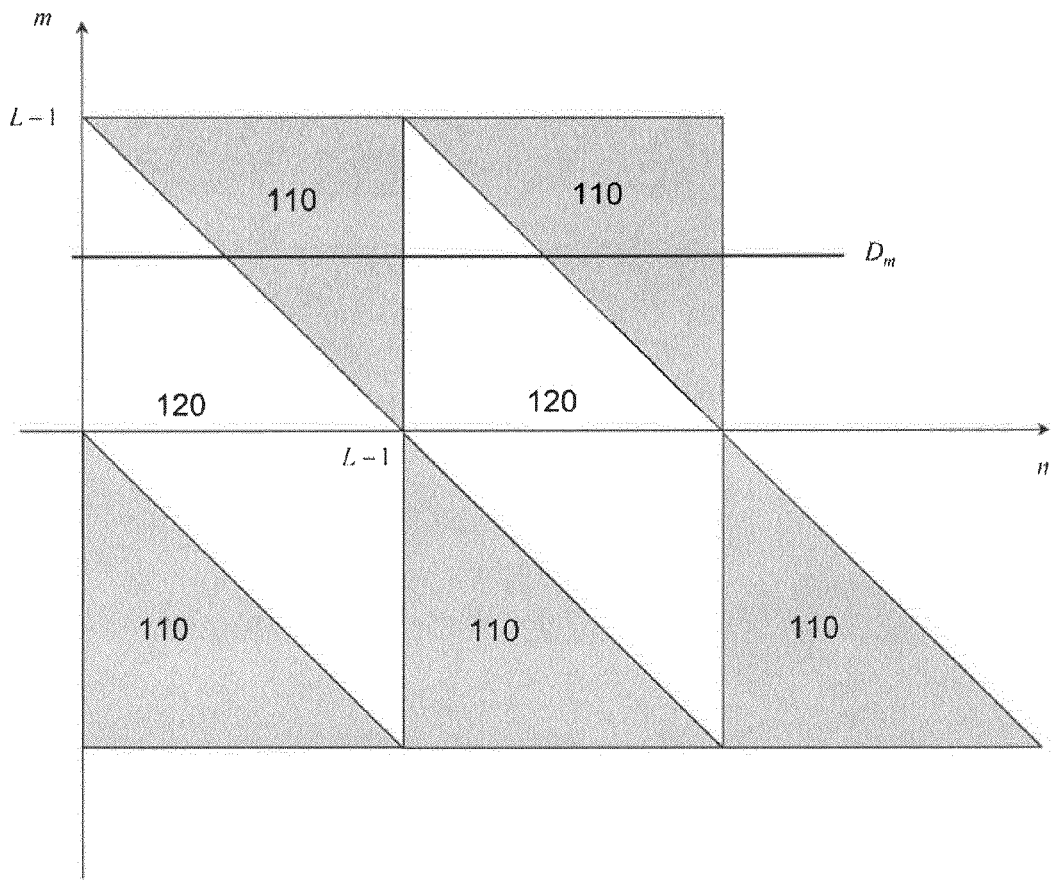
FIG. 1 illustrates the distribution of the values of the autocorrelation function of a spread spectrum signal.

FIG. 1 illustrates the distribution of the values assumed by the autocorrelation function $R_e(n,m)$ depending on the values n and m.

It will be noted that the autocorrelation function $R_e(n,m)$ assumes the value of zero in the grey-tint triangles and non-zero values in the parallelograms left in white.

In the absence of a spread spectrum signal, i.e. in the presence of noise only, the autocorrelation function is zero everywhere except on the straight line $m=0$.

The idea at the basis of the invention is to consider the average energy J of the autocorrelation function for $m \neq 0$, i.e.:

$$J = \sum_{m \neq 0} \lim_{L \to \infty} \left( \sum_{n=0}^{L-1} |R_e(n,m)|^2 \right) \quad (5)$$

The energy J may be considered as a sum of average energies $J_m$ calculated on each of the straight lines $D_m$ parallel to the axis of abscissas and of ordinates $m \neq 0$.

Detection of the presence/absence of a spread spectrum signal is then performed by comparing the value J with a threshold value $J_0$ which will be shown later on. In other words, if $J>J_0$ it is concluded that a spread signal is present and in the opposite case it is concluded that the band is free.

Because of the periodicity of the correlation function, the latter may be developed according to a Fourier series:

$$R_e(n,m) = \sum_{k \in Z} R_e^{k\alpha}(m) e^{2i\pi k\alpha n} \quad (6)$$

wherein $R_e^{k\alpha}(m)$ is the $k^{th}$ Fourier coefficient and $$\alpha = \frac{1}{L}$$

and more generally $$\alpha = \frac{T_e}{LT_c}$$

wherein $T_e$ is the sampling period. The $k\alpha$ values for the relative integer k are called cyclic frequencies and the coefficients $R_e^{k\alpha}(m)$, the cyclic correlation coefficients.

The energy of the autocorrelation function may equivalently be expressed in the spectral domain, i.e.:

$$J = \sum_{m \neq 0} \sum_k |R_e^{k\alpha}(m)|^2 \quad (7)$$

According to a first alternative embodiment of the invention, the energy J is calculated from cyclic correlation coefficients. In practice, the latter may be estimated in the following way:

$$\hat{R}_e^{k\alpha}(m) = \frac{1}{U} \sum_{u=0}^{U-1} s(uT_e) s^*((u-m)T_e) e^{2i\pi u k \alpha} \quad (8)$$

wherein U is the width of a correlation window expressed as a number of samples. It is clear for one skilled in the art that other estimations may be considered without however departing from the scope of the invention.

This first embodiment finds application in the context of semi-blind estimation where the value α is known a priori, and therefore the values of the cyclic frequencies. This will notably be the case if the chip period $T_c$ of the spread signal and the length L of the spreading sequences are known to the terminal. In this case, the energy J is then estimated by:

$$\hat{J} = \sum_{m \neq 0} \sum_k \left| \frac{1}{U} \sum_{u=0}^{U-1} s(uT_e) s^*((u-m)T_e) e^{2i\pi u \frac{kT_e}{LT_c}} \right|^2 \quad (9)$$

It will be noted that this estimation tends to the value of J given by the expression (5) when U is sufficiently large.

According to a second alternative embodiment of the invention, the characteristics of the spreading sequences are not known a priori to the terminal. In this case, the energy of the autocorrelation function is simply estimated in a blind way from the cyclic correlation coefficient at zero frequency, i.e.:

$$\hat{J} = \sum_{m \neq 0} |R_e^0(m)|^2 = \sum_{m \neq 0} \left| \frac{1}{U} \sum_{u=0}^{U-1} s(uT_e) s^*((u-m)T_e) \right|^2 \quad (10)$$

Figure 2:
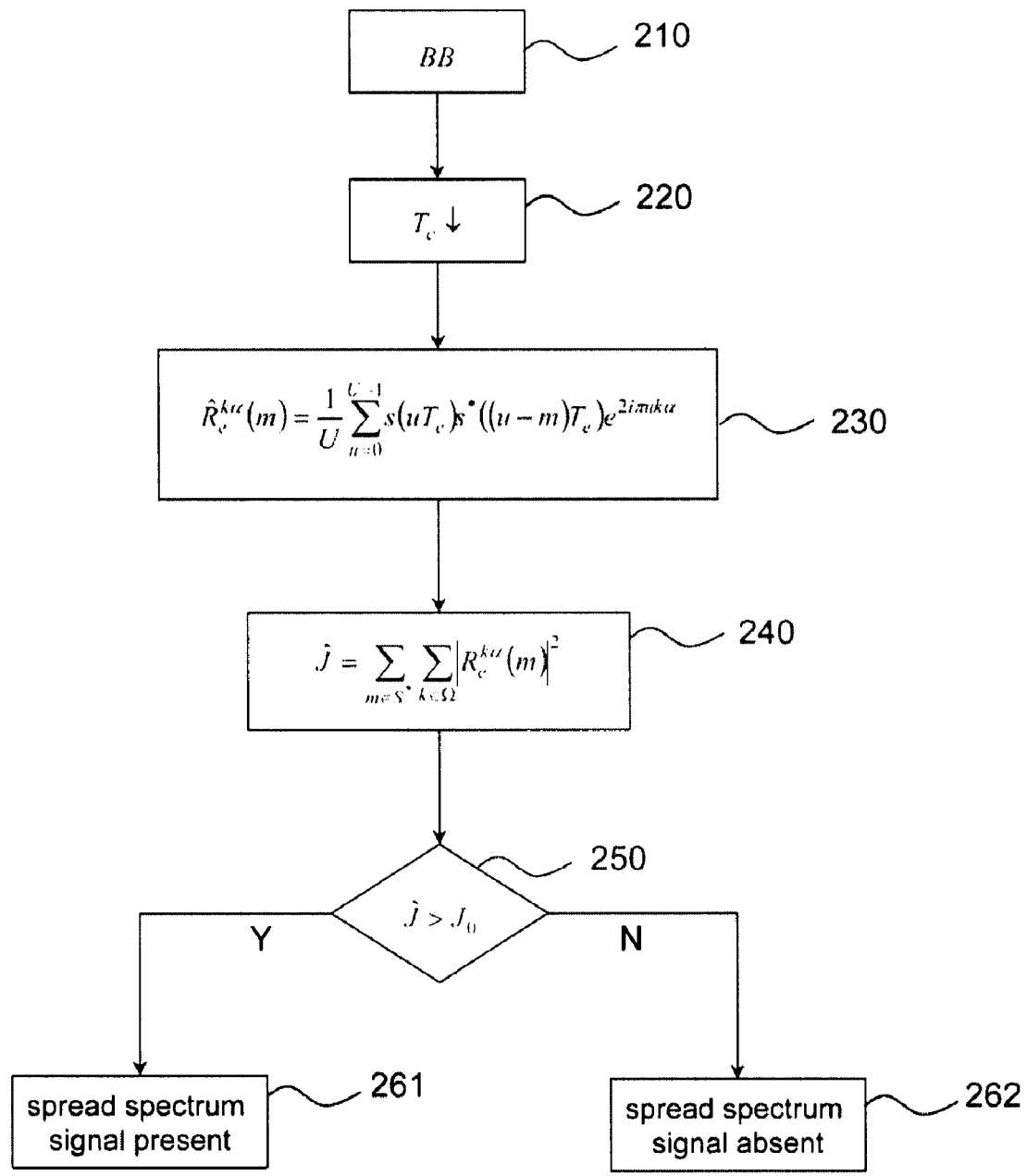
FIG. 2 illustrates the flowchart of a semi-blind method for detecting the presence of a spread spectrum signal, according to an embodiment of the invention.

FIG. 2 illustrates the flowchart of a semi-blind method for detecting the presence of a spread spectrum signal in a spectral band of interest, according to a first embodiment of the invention.

In the first step 210, the received signal is filtered and demodulated in order to translate it into the base band.

In 220, the thereby demodulated signal s is sampled at the chip frequency $$\frac{1}{T_c},$$

supposed to be known to the terminal.

A sequence of samples $\{s(u)\}_u$ is thereby obtained.

In step 230, the cyclic correlation coefficients of the sampled signal are calculated with the expression (8).

In step 240, the energy of the autocorrelation function is calculated with formula (7), which amounts to estimating this energy by means of expression (9).

In practice, the summation over the time shifts is limited to a bounded support S* which does not comprise the value m=0, for example to an interval $[M_{min}, M_{max}]$ or else to the union of two intervals $[-M_{max}, -M_{min}] \cup [M_{min}, M_{max}]$, wherein $M_{min}, M_{max}$ are strict positive integers. Also, the summation over the cyclic frequencies may be limited to a bounded support Ω included in the set $$\left\{ k \mid 0 \leq k \frac{T_e}{LT_c} < 1 \right\},$$

for example to an interval $[K_{min}, K_{max}]$ wherein $K_{min}, K_{max}$ are strictly positive integers.

It will be noted that the energy $\hat{J}$ is eventually obtained in the following way:

$$\hat{J} = \sum_{m \in S^*} \sum_{k \in \Omega} \left| \frac{1}{U} \sum_{u=0}^{U-1} s(uT_e) s^*((u-m)T_e) e^{2i\pi u \frac{kT_e}{LT_c}} \right|^2 \quad (11)$$

In step 250, the estimated energy $\hat{J}$ is compared with a predetermined threshold value $J_0$.

The threshold $J_0$ is advantageously determined as a function of the ratio $$\frac{U}{\sigma^4},$$

wherein $\sigma^2$ is, as stated, the noise variance. For small signal-to-noise ratios, the approximation number $$\sigma^2 = \frac{1}{U} \sum_{u=0}^{U-1} |s(uT_e)|^2$$

may be used. It may be shown that if $J_0$ is selected, which verifies the equation:

$$J_0 - \frac{\sigma^4}{U} \ln\left( \sum_{j=0}^{\kappa-1} \left(\frac{J_0 U}{\sigma^4}\right)^j \frac{1}{j!} \right) = 3.91 \frac{\sigma^4}{U} \quad (12)$$

wherein K=Card(S*)Card(Ω), the false detection probability, i.e. the probability that it is concluded that a spread spectrum signal is present, while it is absent in the band of interest, tends towards 2% when U tends to infinity.

If $\hat{J}>J_0$, it is concluded in 261 that a spread spectrum signal is present in the band of interest, and in the opposite case in 262 that it is absent.

Figure 3:
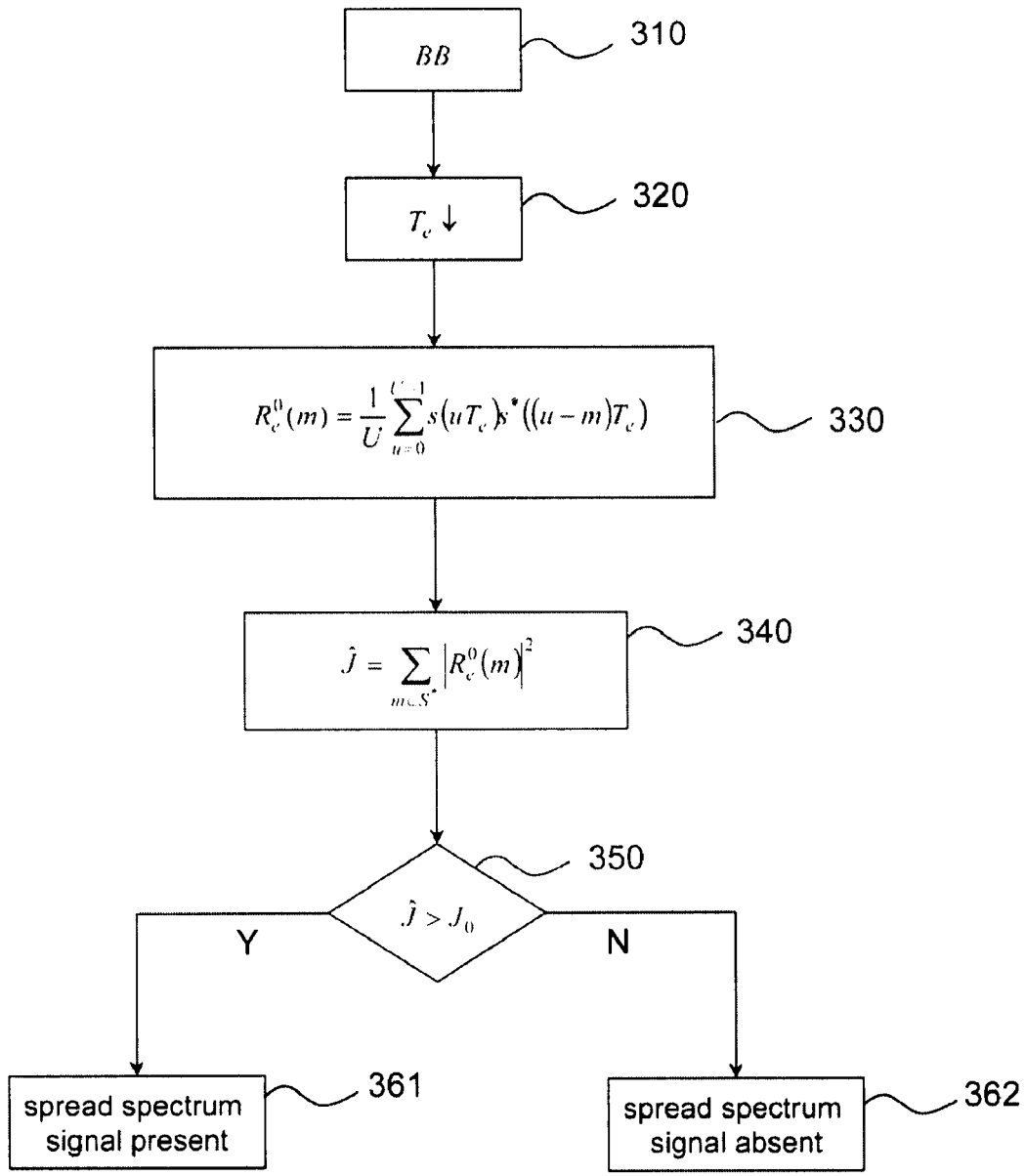
FIG. 3 illustrates the flowchart of a blind method for detecting the presence of a spread spectrum signal, according an embodiment of the invention.

FIG. 3 illustrates the flowchart of a blind detection method for the presence of a spread spectrum signal in a spectral band of interest, according to a second embodiment of the invention.

In step 310, the received signal is filtered in the band of interest and is translated into the base band.

In step 320, the obtained signal is sampled at the Nyquist frequency.

In 330, the cyclic correlation coefficient $R_e^0(m)$ is estimated.

In 340, the energy of the autocorrelation function is estimated from expression (10). In practice, as for the first embodiment, the summation over the time shift values is limited to a bounded support S* which may have the same forms as earlier.

Eventually, the energy $\hat{J}$ is then obtained by:

$$\hat{J} = \sum_{m \in S^*} \left| \frac{1}{U} \sum_{u=0}^{U-1} s(uT_e)s^*((u-m)T_e) \right|^2 \quad (13)$$

In 350, the value $\hat{J}$ is compared with a threshold value $J_0$, determined as for the first embodiment (with card($\Omega$)=1).

If $\hat{J}>J_0$, it is concluded in 361 that a spread spectrum signal is present in the band of interest, and in the opposite case in 362 that it is absent.

This method for detecting the present/absence of a spread spectrum signal in a band of interest may be used by an opportunistic telecommunications terminal before transmitting in this band.

This same method may be used for <<spectrum police>> operations, notably for detecting illegal occupation of the spectrum.

The invention claimed is:

1. A method for detecting the presence or absence of a spread spectrum signal in a frequency band of interest of a received signal, characterized in that:
    the autocorrelation function of said received signal is calculated for a set (S*) of non-zero time shift values (m);
    at least one cyclic correlation coefficient ($R_e^{k\alpha}(m)$) of the autocorrelation function is determined for said time shift values;
    the energy of the autocorrelation function is estimated from the quadratic sum of the values assumed by said cyclic correlation coefficient for said time shift values;
    the thereby estimated energy is compared with a predetermined threshold value and the presence or the absence of said spread spectrum signal in the received signal is inferred from the result of the comparison.

2. The detection method according to claim 1, characterized in that a plurality of cyclic correlation coefficients ($R_e^{k\alpha}(m)$) of the autocorrelation function are determined, each cyclic correlation coefficient being calculated for said time shift values.

3. The detection method according to claim 2, characterized in that said cyclic correlation coefficients are calculated by:

$$\hat{R}_e^{k\alpha}(m) = \frac{1}{U} \sum_{u=0}^{U-1} s(uT_e)s^*((u-m)T_e)e^{2i\pi uk\alpha}$$

wherein s( ) is the received signal, after translation into the base band, U is the size of the correlation window, $T_e$ is the sampling period, expressed as a number of samples, m is a time shift expressed as a number of samples, k is a relative integer, $$\alpha = \frac{T_e}{LT_c}$$

the ratio of the sampling period to the duration of the spreading sequence which has been used for spreading the spectrum of the signal.

4. The detection method according to claim 3, characterized in that the energy of the autocorrelation function is estimated from:

$$\hat{J} = \sum_{m \in S^*} \sum_{k \in \Omega} |R_e^{k\alpha}(m)|^2$$

wherein $\Omega$ is a finite set of relative integers and S* is a finite set of relative integers not comprising the zero value.

5. The detection method according to claim 1, characterized in that a cyclic correlation coefficient ($R_e^0(m)$) of the autocorrelation function is determined for a plurality of time shift values.

6. The detection method according to claim 5, characterized in that said cyclic correlation coefficient is obtained by:

$$R_e^0(m) = \frac{1}{U} \sum_{u=0}^{U-1} s(uT_e)s^*((u-m)T_e)$$

wherein s( ) is the received signal, after translation into the base band, U is the size of the correlation window, $T_e$ is the sampling period, expressed as a number of samples, m is a time shift expressed as a number of samples.

7. The detection method according to claim 6, characterized in that the energy of the autocorrelation function is estimated from:

$$\hat{J} = \sum_{m \in S^*} |R_e^0(m)|^2$$

wherein S* is a finite set of relative integers not comprising the zero value.

8. The detection method according to claim 4 or 7, characterized in that the estimated energy $\hat{J}$ is compared with a predetermined threshold value $J_0$, calculated as a function of the ratio $$\frac{U}{\sigma^4}$$

wherein $\sigma^2$ is the noise variance.

9. The detection method according to claim 8, characterized in that the noise variance, $\sigma^2$, is estimated by:

$$\sigma^2 = \frac{1}{U}\sum_{u=0}^{U-1} |s(uT_e)|^2.$$

10. The detection method according to claim 8, characterized in that it is concluded that a spread spectrum signal is present in the frequency band of interest if $\hat{J}>J_0$ and that in the opposite case it is concluded that such a signal is absent in said band.

* * * * *